(12) United States Patent
Hänggli et al.

(10) Patent No.: US 11,614,320 B2
(45) Date of Patent: Mar. 28, 2023

(54) DEVICE FOR DETERMINING A LAYER THICKNESS IN A MULTILAYER FILM

(71) Applicant: Hch. Kündig & Cie AG, Rüti (CH)

(72) Inventors: Markus Hänggli, Rüti (CH); Hanspeter Hess, Münsingen (CH)

(73) Assignee: HCH. KÜNDIG & CIE AG, Rüti (CH)

( * ) Notice: Subject to any disclaimer, the term of this patent is extended or adjusted under 35 U.S.C. 154(b) by 0 days.

(21) Appl. No.: 17/083,750

(22) Filed: Oct. 29, 2020

(65) Prior Publication Data

US 2021/0131787 A1     May 6, 2021

(30) Foreign Application Priority Data

Nov. 4, 2019   (EP) ..................................... 19206861

(51) Int. Cl.
*G01B 11/06*       (2006.01)
*G01B 11/12*       (2006.01)
(Continued)

(52) U.S. Cl.
CPC .......... *G01B 11/06* (2013.01); *G01B 11/0683* (2013.01); *G01B 11/12* (2013.01);
(Continued)

(58) Field of Classification Search
CPC ............ G01B 9/02091; G01B 11/0683; G01B 11/12; G01B 2210/40; G01B 11/06;
(Continued)

(56) References Cited

U.S. PATENT DOCUMENTS 3,994,593 A * 11/1976 Kato ................. G01N 35/00009
356/69
4,778,995 A * 10/1988 Kulpinski ............. G01T 1/2014
250/368

(Continued)

FOREIGN PATENT DOCUMENTS

CN      110 196 021 A     9/2019
EP      3 330 677 A1      6/2018
(Continued)

OTHER PUBLICATIONS

Extended European Search Report dated May 15, 2020 in corresponding European Patent Application No. 19206861.7, filed Nov. 4, 2019.

*Primary Examiner* — Michael P LaPage
(74) *Attorney, Agent, or Firm* — Global IP Counselors, LLP

(57) ABSTRACT

A device for determining a layer thickness in a multilayer film includes a radiation source configured to generate an electromagnetic primary radiation, a detector configured to detect an electromagnetic secondary radiation emitted by the multilayer film, the secondary radiation being induced by an interaction of the primary radiation with the multilayer film, and a first contact block transparent to the electromagnetic primary radiation and having a first contact surface for creating contact with the multilayer film. The radiation source is arranged on the first contact block in such a way that the electromagnetic primary radiation is guided from the first contact block onto the multilayer film.

20 Claims, 5 Drawing Sheets

(51) Int. Cl.
    *G01M 11/00*    (2006.01)
    *G01N 21/84*    (2006.01)
    *G01N 21/86*    (2006.01)
    *G01B 9/02091*    (2022.01)

(52) U.S. Cl.
    CPC ..... *G01M 11/3172* (2013.01); *G01N 21/8422* (2013.01); *G01N 21/86* (2013.01); *G01B 9/02091* (2013.01)

(58) Field of Classification Search
    CPC ........... G01M 11/3172; G01N 21/8422; G01N 21/4795; G01N 2021/8438; G01N 21/86
    See application file for complete search history.

(56) References Cited

U.S. PATENT DOCUMENTS

| | | | |
|---|---|---|---|
| 5,633,712 A | 5/1997 | Venkatesh et al. | |
| 5,731,876 A * | 3/1998 | Venkatesh | G01B 11/0675 356/73.1 |
| 5,850,287 A | 12/1998 | Sorin et al. | |
| 6,038,027 A * | 3/2000 | Marcus | G01B 11/0691 356/503 |
| 6,404,491 B1 * | 6/2002 | Hougham | G01N 21/43 356/429 |
| 2004/0227952 A1 | 11/2004 | Jasapara et al. | |
| 2005/0088647 A1 | 4/2005 | Shanmugasundram et al. | |
| 2012/0281427 A1 * | 11/2012 | Shakespeare | G01J 3/501 362/555 |
| 2014/0253717 A1 * | 9/2014 | Adelson | H04N 7/183 348/88 |
| 2017/0168206 A1 * | 6/2017 | Kakinoki | G02B 5/3083 |
| 2018/0364160 A1 * | 12/2018 | Aben | G01N 21/86 |
| 2018/0372650 A1 * | 12/2018 | Pieralisi | G01N 21/896 |
| 2019/0171152 A1 * | 6/2019 | Sakakibara | B65H 7/14 |

FOREIGN PATENT DOCUMENTS

| | | |
|---|---|---|
| JP | 2010-008170 A | 1/2010 |
| WO | WO-2013074607 A1 * | 5/2013 ........... G03H 1/0248 |

* cited by examiner

DEVICE FOR DETERMINING A LAYER THICKNESS IN A MULTILAYER FILM

CROSS-REFERENCE TO RELATED APPLICATION

This application claims priority to European Patent Application No. 19206861.7, filed Nov. 4, 2019, the contents of which are hereby incorporated herein by reference in their entirety.

BACKGROUND

Field of the Invention

The invention relates to a device for determining a layer thickness or several layer thicknesses in a multilayer film. The invention further relates to a method for determining the layer thickness or several layer thicknesses in a multilayer film.

Background Information

Conventional thickness measuring systems for extruded plastic films are well known from the packaging industry, inter alia. Optical, radiometric, inductive and capacitive measuring methods are among the measuring methods used. Depending on the films produced, e.g. single-layer films or often also multi-layer multilayer films, or depending on the materials used for the films, different measuring methods are used today, in particular contact, low-contact or non-contact thickness measuring systems. In most cases, the online thickness measurement is currently performed by a capacitive thickness sensor, which is in constant contact with the film.

SUMMARY

However, it has been found that with a capacitive thickness sensor only a total thickness of the film can be measured, which is problematic in the case of a barrier film with temperature-dependent permittivity of the barrier layers.

Nuclear backscattering by gamma or X-Ray is known as a further measuring method for thickness determination as an online measurement. However, even here only the total thickness can be measured reliably, and the scatter of the measured values is relatively high in the case of a very thin film. In addition, a thickness measurement can be performed via mechanical scanning in the form of an offline measurement. However, even with this method only the total thickness can be measured. A thickness measurement can also be performed with ultrasound (offline and, to a limited extent, online). Although this is relatively precise and reliable, only the total thickness can be measured, too. In the state of the art, the thickness measurement on the film is further performed via a spectrum of an infrared absorption (online at the edge of a flattened film). The thicknesses of different individual layers can be measured, but not the position of the respective individual layer in the film. Thus, only one single sum of several similar layers is measured. They cannot be distinguished. In addition, calibration is necessary for each individual material. Furthermore, thickness measurements are performed in the state of the art by microscopy (polarization contrast) of microtome sections. These are performed as measurement on a microtome section and can only be used for individual measuring points. In addition, the preparation effort for microtome sections is very high.

The remaining demand in the state of the art for reliable measuring systems to determine the individual layer thicknesses of individual layers in a multilayer film is not covered by the systems described above.

Optical coherence tomography (OCT) is an imaging method to obtain 2- and 3-dimensional images of scattering materials in micrometer resolution.

For this purpose, broadband light of temporally low coherence length is split into two parts in a beam splitter. One part is directed onto the sample. The other part passes through a reference path. The light reflected by the sample is brought to interference with the reference light in a beam splitter. Then, different structures along the optical axis (depth) can be distinguished from the interference signal. Three-dimensional images are obtained by lateral scanning over the sample. OCT can be compared to ultrasound imaging (sonography), with the difference that it uses light instead of sound.

Although the main field of application for OCT is medicine, primarily ophthalmology, but OCT measuring devices are also used to check various geometric properties of 3D components during the process, such as the outer and inner diameter, the wall thickness or generally dimensions at a defined height.

In general, a distinction is made in OCT technology between the Time Domain (TD-OCT) and the Frequency Domain (FD-OCT) technology. In the case of TD-OCT, an interferometer with a time-variable reference path and a sample path is broadband illuminated. The variable length of the reference path is usually realized with a movable mirror and is therefore limited in the measuring speed.

However, in the case of frequency domain OCT (FD-OCT) technique, an interferometer with reference and sample arm is illuminated either by a broadband laser source (SD-OCT) or by a narrow-band but time-tunable laser source (SS-OCT). In the case of SD-OCT, a spectrometer serves for the parallel detection of the different spectral channels, in the second case the different wavelengths are recorded sequentially with a single detector with high electronic bandwidth. Both systems have an equivalent sensitivity, with SS-OCT higher recording speeds can be achieved.

In the field of optical fiber technology, a characterization and control of various fiber properties is performed by OCT measurements during the drawing process of fibers from a preform. Here, US2004227952 describes a FDOCT technique that uses backscattered light to reconstruct the cross-section of a fiber, whereby information about the glass, the coating, and defects are provided in a single measurement.

A broadband light source is focused to provide an input beam in a direction substantially perpendicular to the fiber sidewall. The light reflections of material boundary surfaces (e.g. air/fiber, coating/jacket area etc.) interfere with each other and form an interference pattern in the spectral range. The light reflected back from these various intersections is then applied as an input signal to a spectrometer, which then generates a spectrogram of the interference pattern. Subsequently, a fast Fourier transformation (FFT) of the spectrogram is performed, whereby the peaks of the FFT coincide with the locations of each material boundary surface. By analyzing the corresponding interference patterns, the thickness of each layer in the fiber (as well as the total fiber diameter) can be determined.

The main problems of thickness measuring systems in the state of the art are that in most cases only the total thickness of the multilayer films can be reliably determined. If an individual layer thickness measurement can be performed at all, it must be performed elaborately in the form of an offline measurement.

It is therefore the object of the invention to avoid the problems known from the state of the art and, in particular, to provide a device and a method which enable a reliable determination of the individual layer thicknesses of a multilayer film.

The subject matters of the invention meeting these objects are characterized by the features described herein.

Thus, an embodiment of the invention relates to a device for determining a layer thickness or several layer thicknesses in a multilayer film, comprising a radiation source for generating an electromagnetic primary radiation, a detector for detecting an electromagnetic secondary radiation emitted by the multilayer film, which secondary radiation is induced by an interaction of the primary radiation with the multilayer film, and a first contact block transparent to the electromagnetic radiation and having a first contact surface for creating a force-locked contact with the multilayer film. The device is characterized by the radiation source which is arranged on the first contact block in such a way that that the electromagnetic primary radiation can be guided from the first contact block onto the multilayer film.

An embodiment of the invention further relates to a method for determining the layer thickness in the multilayer film by the device according to the invention. Here, the contact between the first contact surface and the multilayer film is created. The electromagnetic primary radiation is guided from the first contact block onto the multilayer film and the electromagnetic secondary radiation emitted by the multilayer film is detected. The secondary radiation is induced by an interaction of the primary radiation with the multilayer film.

As a consequence, the radiation source can be arranged at or at least partially in the contact block, so that the primary radiation can be guided from the radiation source through the contact block onto the multilayer film to be measured.

The secondary radiation can be a secondary radiation transmitted by the multilayer film or reflected by the multilayer film.

In a particularly preferred embodiment, the device according to the invention is an OCT measuring system/device. Here, the secondary radiation is particularly preferred the secondary radiation reflected by the multilayer film.

If the device according to the invention is designed as an OCT device, it can comprise an interferometer for performing a corresponding OCT method in order to divide an electromagnetic source radiation that can be generated by the radiation source into the electromagnetic primary radiation (a sample beam) that can be generated by the radiation source and a reference beam by a beam splitter. The light reflected from the multilayer film (secondary radiation) is then superimposed on the reference beam in an interferometer and is brought to interference in this way. Different layers in the multilayer film can then be distinguished and the individual layer thicknesses can be determined from the interference signal. The method according to the invention by OCT can be based on a white light interferometry, in which a primary radiation with low temporal coherence is used. In this embodiment, the device according to the invention preferably has the structure of a Michelson interferometer.

In practice, the radiation source illuminates the multilayer film with the primary radiation (sample beam) via a beam splitter, in particular with the sample beam of the white light interferometer. For this purpose, the sample beam part (i.e. the primary radiation) of the electromagnetic source radiation that can be generated by the radiation source is guided through the contact block onto the multilayer film. The light which is let through by the beam splitter (reference beam) falls on a mirror and is reflected back by it. The reflected sample beam (secondary radiation) and the reference beam meet again (the two reflected beams are recombined) and interfere exactly when the difference of the paths travelled by both beams is smaller than the coherence length. The interference signal is recorded with the detector and then evaluated. By moving the mirror in the reference arm, interference signals can be generated from different depths of the multilayer film, provided there are reflective layer transitions there. Moving the mirror while simultaneously measuring the interference signal thus allows axial scanning of the multilayer film. Since path length differences can also be indicated as transit time differences via the speed of light, this embodiment according to the invention is a time-domain (TD) OCT.

The method according to embodiments of the invention can be designed as FD-OCT, in which a broadband interference is detected with spectrally separated detectors (either by coding an optical frequency in time with a spectrally scanning radiation source or with a dispersive detector, such as a grating or a photodiode array). Due to the Fourier relationship (Wiener-Khintchine theorem between autocorrelation and spectral power density), an A-scan (depth scan) can be calculated immediately by a Fourier transformation from the recorded spectra without moving the reference arm.

In particular, the FD-OCT method can be performed as an SS-OCT method by recording the individual spectral components of the secondary radiation one after the other by tuning the wavelength of the primary radiation (swept source, SS). For this reason, a method according to embodiments of the invention by SS-OCT can do without a spectrometer as a detector, but the radiation source must have a variable wavelength. However, if an interferometer with a reference and sample beam is irradiated with a broadband laser source, the method according to embodiments of the invention is performed as SD-OCT.

For the thickness measurement of the individual layers in a transparent multilayer film, an FD-OCT method can be used particularly preferred. Here, the radiation source can be a laser, in particular a broadband laser, particularly preferably a supercontinuum laser. The radiation source can operate in a wavelength range from about 400 to 2400 nm. The following relationships apply in particular for the wavelength range used: short wavelengths and a wide bandwidth (for example 600 to 900 nm) result in a high resolution. Large wavelengths (about 1300 nm) result in less signal loss due to scattering. The detectors for the IR range are made of a different material than detectors for the YTS range (visible light). For this reason, the wavelength range is preferably restricted or different detectors are used for different wavelength ranges for the realization of the device according to embodiments of the invention.

In the method according to an embodiment of the invention, the A-scan (across the multilayer film) can be obtained by the Fourier transformation of the interference spectrum. This means that the A-scan can be detected by a single measurement when the spectrum of interference is recorded, i.e. the interferences of the individual wavelengths or light frequencies.

A B-scan (parallel to the surface of the film) is obtained by a transport of the multilayer film through a measuring point/measuring range. In an online measurement, measurements of the film thickness are made on the multilayer film during the running production in order to enable a regulation of a film thickness profile, i.e. the layer thicknesses of the individual layers of the multilayer film or at least the total thickness of the multilayer film.

In particular in the case of plants for the production of blown films, i.e. plastic films extruded in the form of bubbles, a tubular film with a defined diameter and a defined average thickness is produced, whereby the desired layer thickness profile can be adjusted manually or automatically. Here, parameters such as a volume of a gas (typically air) which is blown into the bubble or an advancing or drawing speed of the bubble can be corrected with respect to a rotational speed of an extrusion head screw conveyor in dependence on the method according to the invention for determining the layer thickness. The thickness profile at the circumference of the film bubble can be regulated at the blow head by heating or cooling locally at the circumference of the blow head.

In order to enable a simplified handling and a transport of the multilayer film, the first contact block can be a first transport roller rotatable around a first axis of rotation and the first contact surface can be a first transport surface. In this way, the multilayer film can be transported and conveyed through the measuring point by rotating the first transport roller by contact with the first transport surface.

The radiation source is then arranged on the first transport roller in such a way that the electromagnetic primary radiation from the rotating first transport roller can be guided onto the multilayer film.

In addition, the device according to embodiments of the invention can comprise a second transport roller, which has a second transport surface for transporting the multilayer film. The multilayer film is then arranged in a gap between the first and second transport roller so that the multilayer film can be moved between the transport rollers through and thus through the measuring point by the rotation of the first and second transport roller. The second transport roller can preferably be transparent or absorbent or reflective for electromagnetic radiation.

Instead of the transport rollers, the multilayer film can also be pulled through two fixed glasses, which are designed as two convex lenses, for example. In this embodiment, the first contact block would then be designed as a first lens and a second contact block as a second lens, whereby the multilayer film is passed between the first and second lens in the operating state. In addition, it is possible that the radiation source is arranged on the first contact block via a lens. The radiation source is then arranged at the first lens in such a way that the electromagnetic primary radiation from the first lens can be guided onto the multilayer film.

As an example of electromagnetic radiation, if light radiates perpendicular to a boundary surface between two materials with different refractive indices, a part of the radiation is thus reflected. The refractive index of matter is generally dependent on the wavelength of light. The refractive index of typical film materials for the multilayer film is typically 1.49 to 1.53.

Reflections at a layer boundary between two materials with refractive index $n_1$ and $n_2$ are calculated as follows:

$$r=(n_1-n_2)/(n_1+n_2)$$

An intensity of an OCT signal is proportional to r. Air has a refractive index of n=1.0 and glass has a refractive index of n=1.5. In this respect, r is an amplitude reflection coefficient and $R=r^2$ is an intensity or power reflection degree.

For the device according to an embodiment of the invention, mainly the reflections directly at the measuring point are important. The transitions between the different materials inside the multilayer film can result in reflections (reflected secondary radiation) in the order of approximately 0.003%. If the multilayer film is measured directly in the environment with air, the reflections (reflected secondary radiation) at an outer boundary of the multilayer i.e. a transition from air to multilayer film or from multilayer film to air, are about in the order of 4%, i.e. about 1000 times stronger than the reflections (reflected secondary radiation) at the layer boundaries inside the multilayer film.

In order to make a reflection on an outer surface of the multilayer film as small as possible, an optical impedance adaptation can be performed in the method according to the invention with the device according to the invention. Without impedance adaption, the measurement in the method according to the invention can, as mentioned above, be outshined by interference signals at the outer layer boundaries of the multilayer film or by reflections from other optical elements. Strong reflections are present, inter alia, at the layer boundaries to air. The reflections at transitions between the individual inner layers of the multilayer film are normally much weaker. All signals arrive at the detector/spectrometer at the same time and thus, the parts of the external reflections can overshine the parts of the internal reflections. The impedance adjustment (also index adjustment) is preferably done in two steps. The impedance adjustment should be particularly effective directly on the multilayer film, in the area that is evaluated by the OCT device (measuring range). A little further away, i.e. at a distance of more than 1 mm, for example, the impedance adjustment can be less effective, because the resulting reflections are no longer in the detected interference range. The multilayer film to be measured is preferably held between two transparent contact blocks. When selecting the material for the contact blocks or contact rollers, it is taken into account that this material has a refractive index that is close to that of the film material. On the side of the first contact block on which the electromagnetic radiation enters, the reflection at the entry surface into the contact block is reduced or avoided, for example by applying a suitable anti-reflection coating of this surface or by slightly inclining this surface with respect to the radiation axis so that the reflection is no longer reflected back.

The optical impedance adjustment from the contact block to the multilayer film is preferably performed by an immersion fluid, which is applied to the contact blocks or to the multilayer film, in particular to the two outer surfaces of the multilayer film, in such a way that a direct (air-free) contact between the multilayer film and the first and in particular also the second transport roller is created via the immersion fluid. The reflection is further minimized by the remaining difference in the refractive indices of the multilayer film and contact block with the immersion fluid. Above all, the immersion fluid displaces the air (with n=1.0) from the contact area of the multilayer film and contact block.

Since the device according to embodiments of the invention is not intended to use different materials for contact rollers and immersion fluid for each type of film, contact rollers made of PMMA or glass, for example, with refractive indices between 1.47 and 1.53, which correspond to a refractive index close to the normal refractive indices of film materials from 1.47 to 1.54, are used. The immersion fluid is to be selected preferably such that it has a similar refractive index as the transport rollers. A first refractive index $n_a$ of the first transport roller (and, if applicable, the second transport roller) should be substantially equal to a second refractive index $n_b$ of the immersion fluid. As mentioned above, the refractive index of the immersion fluid should be substantially equal/similar to that of the multilayer film, so that a strong "refractive index transition" is avoided. In particular, a ratio of na to nb can be between 0.9 and 1.1, particularly preferably between 0.95 and 1.05. Let $n_a$ be the refractive index of the material of the contact block, $n_b$ be the refractive index of the immersion liquid and $n_c$ be the refractive index of the outer layer of the multilayer film. Preferably, the refractive index of the immersion fluid is selected such that the deviation from the refractive indices of the materials of the film and the contact blocks is as small as possible. In particular, a ratio of $n_a$ to $n_b$ and of $n_b$ to $n_c$ can be between 0.9 and 1.1, particularly preferably between 0.95 and 1.05.

In order to reduce the reflection at a transition from the transport roller to the immersion fluid and that from the immersion fluid to the multilayer film to the same extent, the refractive index of the immersion fluid n (immersion fluid) (also $n_b$) can be selected equal to a geometric mean of the refractive indices of multilayer film and transport roller:

$$n(\text{immersion fluid}) = \sqrt{n(\text{transportroller}) \times n(\text{multilayerfilm})}$$

Here, n (multilayer film) corresponds to the refractive index of the multilayer film and is preferably the refractive index of a material of the multilayer film on an outer side of the multilayer film. n (transport roller) (also $n_a$) is the refractive index of the transport roller.

The first and second transport rollers preferably comprise the same material so that they have a largely identical refractive index. For example, glass and/or acrylic glass (chemical polymethyl methacrylate, abbreviation PMMA), in particular Plexiglas®, can be used as material for the contact blocks/transport rollers.

In practice, a fluid dispenser can be provided for the device according to the invention, which is provided in such a way that, in order to form an immersion fluid layer between the multilayer film and the contact block, in the operating state the multilayer film can be applied with the immersion fluid from the fluid dispenser and the electromagnetic primary radiation from the first contact block can be guided onto the multilayer film via the immersion fluid layer.

This means that the immersion fluid can be applied from the fluid dispenser to the multilayer film during operation in order to form and maintain the immersion fluid layer between the multilayer film and the contact block. In particular, the immersion fluid can be continuously applied to the multilayer film passing through the measuring point during the running production. In principle, it is sufficient if the multilayer film is wetted with the immersion fluid at least at the measuring point so that the direct (air-free) contact is created between the multilayer film and the transport roller (the transport rollers) at least at the measuring point.

Inter alia, immersion fluids with n=1.49–1.53 are suitable as immersion fluid. An immersion fluid can be an immersion oil and can comprise benzyl benzoate, allyl alcohol and/or glycerin, inter alia.

By wetting the multilayer film with the immersion fluid, an adjustment of the wave impedance or the refractive index from contact block to multilayer film is achieved for the light waves. If the film is immersed in immersion fluid with the refractive index of 1.53, the reflection decreases by a factor of 1000 to 0.004%. For a stable positioning of the multilayer film in the device, an arrangement with the first and second transport roller is preferably used, so that an assembly of transport roller-immersion fluid-multilayer film-immersion fluid-transport roller is obtained.

In a preferred embodiment, the immersion fluid can also be applied to the contact block (first and/or second), wherein the immersion fluid reaches the multilayer film indirectly via the contact block.

In practice, the first transport roller and in particular also the second transport roller can comprise an elastic coating on the first and respectively the second transport surface. The elastic coating is transparent to the electromagnetic primary radiation and preferably has a similar or equal refractive index as the material of the transport rollers. The elastic coating can in particular comprise an elastic polymer. In the operating state, the first transport roller and the second transport roller can exert a pressure on each other in such a way that a distance between the transport rollers and the multilayer film is minimized by the elastic coating and the air is completely displaced from a contact area of transport roller and multilayer film and thus from the measuring range.

In an embodiment of the invention, the radiation source can be arranged on one side of the first contact block/the first transport roller in such a way that the electromagnetic primary radiation can be guided along an axis into the first contact block. A reflector is arranged twisted to the axis such that the electromagnetic primary radiation can be focused onto the multilayer film, whereby the radiation source is arranged in particular at the first contact block so that the primary radiation can be coupled into the contact block without contact, in particular through a reflection-free window or a reflection-free lens.

The reflector can be arranged in the first transport roller by a stationary support body. In the operating state, the reflector is thus static, wherein the first transport roller rotates around the stationary support body. In a rotation gap between the support body and the first transport roller rotatable around the support body, the immersion fluid is preferably arranged for suppressing a reflection between support body and transport roller by avoiding a refractive index change at their material boundary. In this way, the reflections are further minimized as the primary radiation passes through the transport roller to the multilayer film.

In practice, the reflector can be arranged in the support body. Here, the support body can comprise a solid material, which solid material is transparent to the electromagnetic radiation. The reflector is then cast into the solid material. As an alternative, the support body can be filled with the immersion fluid so that the reflector is immersed in the immersion fluid. Particularly preferred, the support body has a closed cylindrical surface, which is transparent to the electromagnetic radiation, so that no vortices are created in the immersion fluid by the rotating movement of the transport roller around the support body. An interior of this support body is advantageously filled with an immersion fluid. In this way, the whole space is filled with material with approximately the same refractive index for the whole path of the electromagnetic radiation (primary radiation and in particular also secondary radiation), from an entrance window (of the contact block) into the contact block to the measuring point on the multilayer film.

The reflector can be designed as a mirror, in particular as a parabolic mirror, which focuses the primary radiation onto the multilayer film, in particular on the measuring point on the multilayer film.

In a particularly preferred embodiment, the multilayer film to be measured is conveyed between the two transparent transport rollers. An expanded parallel laser beam is introduced axially into the first transparent transport roller and focused by an off-axis parabolic mirror onto the periphery of the first transport roller, exactly on the line of contact with the second transport roller, or rather on the center of the multilayer film which is transported between the two rollers. To avoid strong reflections on the outer surfaces of the multilayer film, the immersion fluid is applied on both sides of the multilayer film between the surfaces of the multilayer film and the transport rollers.

The method according to embodiments of the invention/ the device according to embodiments of the invention can be used for an off-line measurement (outside the production plant) on a film sample of the multilayer film. Here, the multilayer film is preferably conveyed in a force-locked manner between the first contact block and the second contact block, whereby a measurement is made by the radiation source and the detector.

The method according to embodiments of the invention/ the device according to embodiments of the invention can be used for an online measurement (during production operation) at one edge or both edges of the flattened multilayer film. The multilayer film is preferably pulled through stationary contact blocks (e.g. made of glass) or conveyed between the first transport roller and the second transport roller. The transport rollers can either be rotated passively by the multilayer film or the transport rollers can be rotated actively and synchronously with the multilayer film.

Since a few centimeters are often cut away at one edge of the flattened multilayer film, an immersion fluid can be used particularly preferred here. Since barrier film includes different materials (polyethylene (PE), polyamide (PA), ethylene-vinyl alcohol copolymer (EVOH), . . . ) and is therefore not homogeneous, a recycling of the multilayer film is usually not possible. Thus, the immersion fluid is disposed of after the performed measurement together with the cut-off edge strip without having to remove it from the multilayer film.

Since a roll length of a multilayer film roll can be several kilometers, the demand for immersion fluid for this type of application is very high. For this application, the use of the elastic coating on the first and/or second transport roller can be advantageous (or a complete elastic transport roller), because the air between the multilayer film and transport roller can be displaced by the elastic coating to avoid a refractive index change, at least in the area where the measurement takes place.

The TD-OCT method can tolerate a greater dynamic of the interference signals and therefore the immersion can preferably be avoided completely. TD-OCT is usually too slow for the online measurements, which is why an FD-OCT method is preferably used for online measurements.

The device according to embodiments of the invention and the method according to the invention for determining the layer thickness in the multilayer film can be used to detect boundary surfaces of individual layers in the interior of the film (multilayer film) by FD-OCT. The film is preferably embedded with the immersion fluid between two optical contact blocks in such a way that no reflections occur on the surface of the film that would override the reflections at the inner boundary surfaces. The device preferably uses the contact blocks in the form of rollers (transport roller). The coupling and uncoupling of the radiation (primary and secondary radiation) takes place axially via the first roller, whereby a mirror directs the radiation from the inside of this roller onto the film to be measured.

BRIEF DESCRIPTION OF THE DRAWINGS

The invention will be explained in more detail hereinafter with reference to the drawings.

DETAILED DESCRIPTION

Figure 1A:
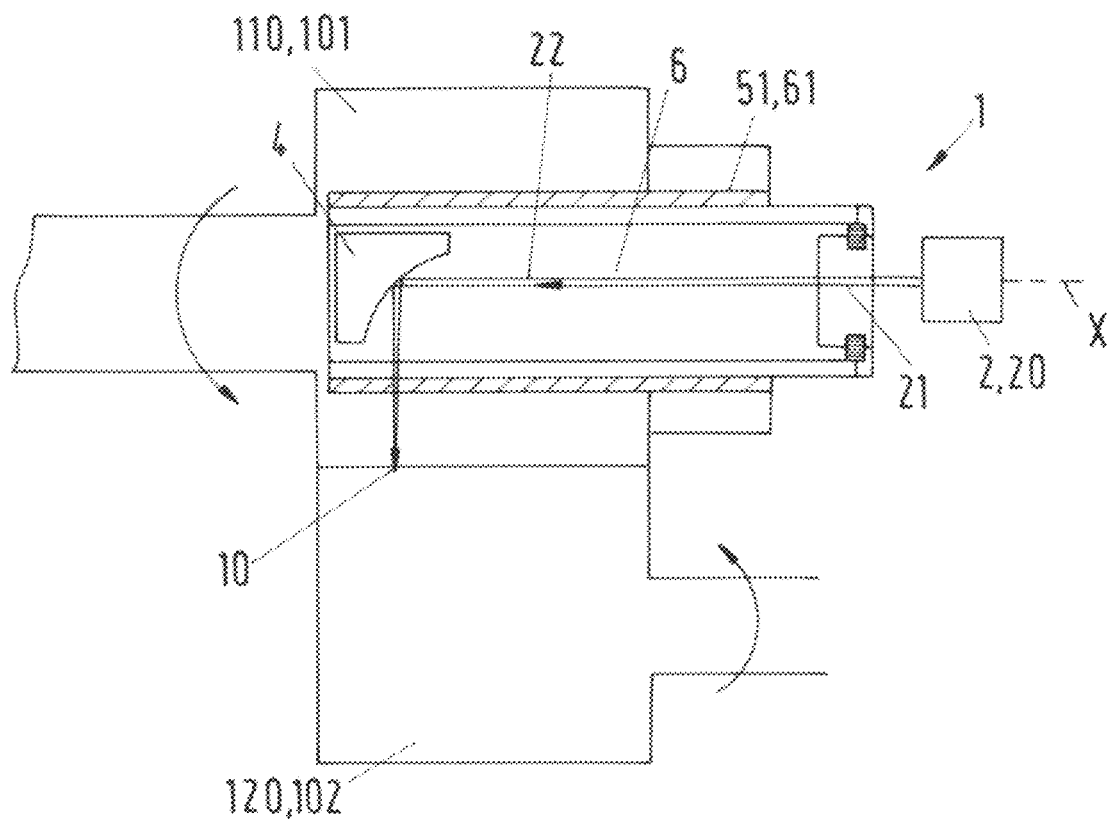
FIG. 1A is a schematic representation of a device according to the invention for determining a layer thickness in a multilayer film.

FIG. 1A shows a schematic representation of a device 1 according to an embodiment of the invention for determining a layer thickness in a multilayer film 10.

The device 1 comprises a radiation source 2 which can be designed as a laser. In the operating state, the radiation source 2 generates an electromagnetic primary radiation 21. The device additionally comprises a detector (not shown here) for detecting an electromagnetic secondary radiation 22 emitted by the multilayer film 10, which secondary radiation 22 is induced by an interaction of the primary radiation 21 with the multilayer film 10. If the method according to an embodiment of the invention is performed as an OCT method, the device can additionally comprise an interferometer, wherein the detector then detects an interference spectrum. For this purpose, a unit 2, 20 comprises the laser 2 as radiation source, as well as the interferometer and an OCT evaluation unit with the detector.

In addition, the device 1 comprises a first transport roller 110 transparent to the electromagnetic primary radiation with a first contact surface 101 for creating a contact with the multilayer film 10.

The radiation source 2 is arranged on one side of the first transport roller 110 in such a way that the electromagnetic primary radiation 21 can be guided along an axis X into the transport roller 110.

In addition, the device 1 comprises a second transport roller 120 transparent to the electromagnetic primary radiation with a second contact surface 102 for creating a contact with the multilayer film 10. The multilayer film 10 is arranged between the first contact surface 101 and the second contact surface 102. In the operating state, the multilayer film 10 can be moved by rotating the first and second transport rollers 110, 120.

An off-axis parabolic mirror is arranged in the transport roller, which is twisted to the axis X, so that the electromagnetic primary radiation 21 is focused onto the multilayer film 10. The radiation source 2 radiates from the outside into the side of the transport roller 110. After the interaction of the primary radiation 21 with the multilayer film 10, the primary radiation 21 is reflected as secondary radiation 22 by the multilayer film 10 and detected in the unit 2, 20 with the OCT evaluation unit, as well as the interferometer and the detector.

The parabolic mirror 4 is arranged in the first transport roller 110 by a stationary support body 6, and in a rotation gap 61 between the support body 6 and the first transport roller 110 rotatable around the support body 6, the immersion fluid 51 is arranged for suppressing a reflection by avoiding a refractive index change at a material boundary. A space of the support body 6, in which the parabolic reflector 4 is arranged, can either be filled with immersion fluid, or the parabolic reflector 4 can be embedded in a material of the support body 6.

This means that the transport roller 110 rotates around the support body 6 in the operating state. Therefore, the transport roller 110 is rotatably supported in relation to the support body 6. The support body 6 is also filled with the immersion fluid 51.

The second transport roller 120 preferably includes a material with the same or similar optical properties as the first transport roller 110 and the immersion fluid 51 (similar/same refractive index). One surface of the second transport roller can also be absorbent, so that as far as possible no reflections occur.

Figure 1B:
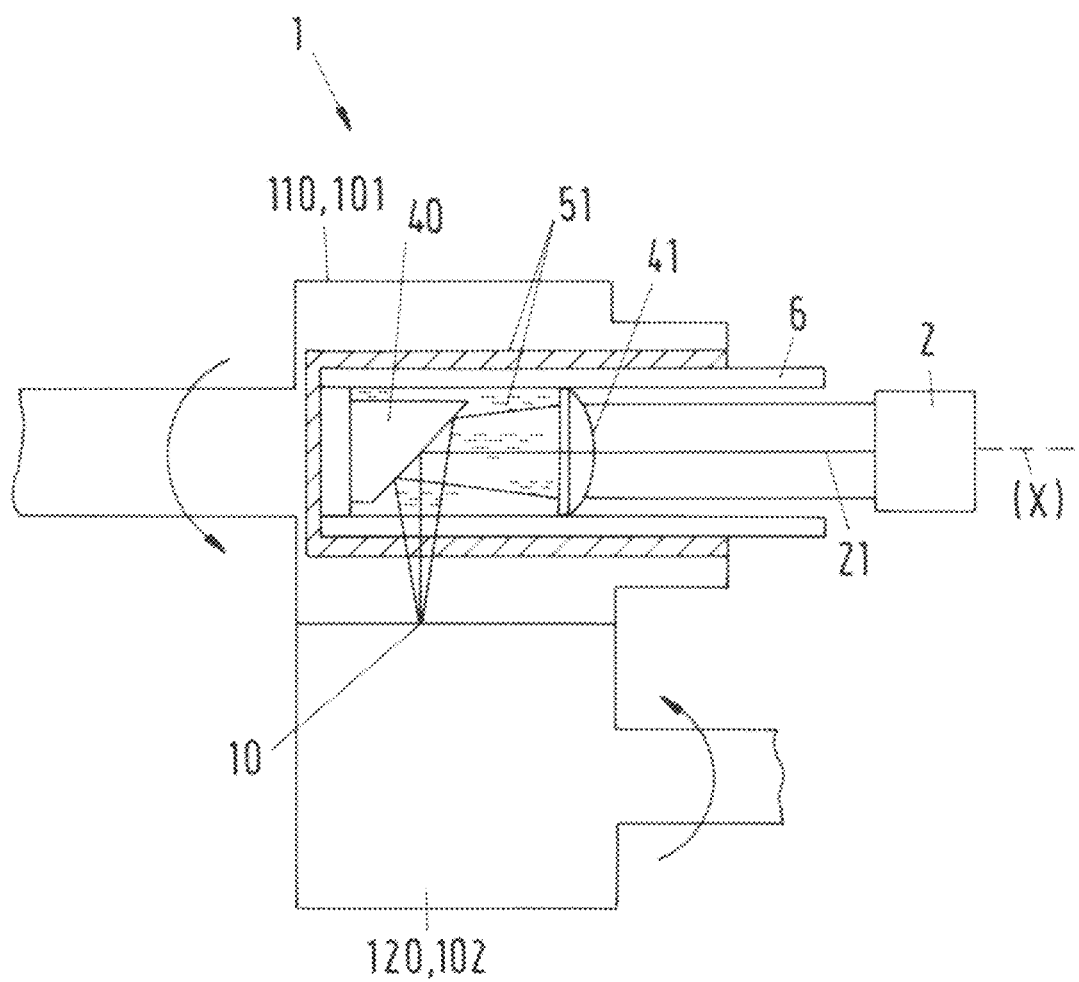
FIG. 1B is a schematic representation of a device according to the invention for determining a layer thickness in a multilayer film with a plano-convex lens.

FIG. 1B shows a schematic representation of a device 1 according to an embodiment of the invention for determining a layer thickness in a multilayer film with a plano-convex lens 41. In FIG. 1B, as in FIG. 1A, the primary radiation 21 is coupled axially along the axis X into the transport roller 110. This primary radiation 21 can be an expanded laser beam. This is focused by the plane-convex lens 41 and a focal point of the plano-convex lens 41 is directed by a plane mirror 40 to a measuring point in the multilayer film 10.

The space between the plano-convex lens 41 and the mirror 40 can be filled by the immersion fluid 51 to avoid reflections by refractive index transitions. The plano-convex lens 41 is preferably antireflective on one side facing the air.

With FIG. 1B compared to FIG. 1A, there is more freedom in a selection of an aperture for the irradiation of the primary radiation 21 to the measuring point than with a parabolic mirror according to FIG. 1A.

Figure 2:
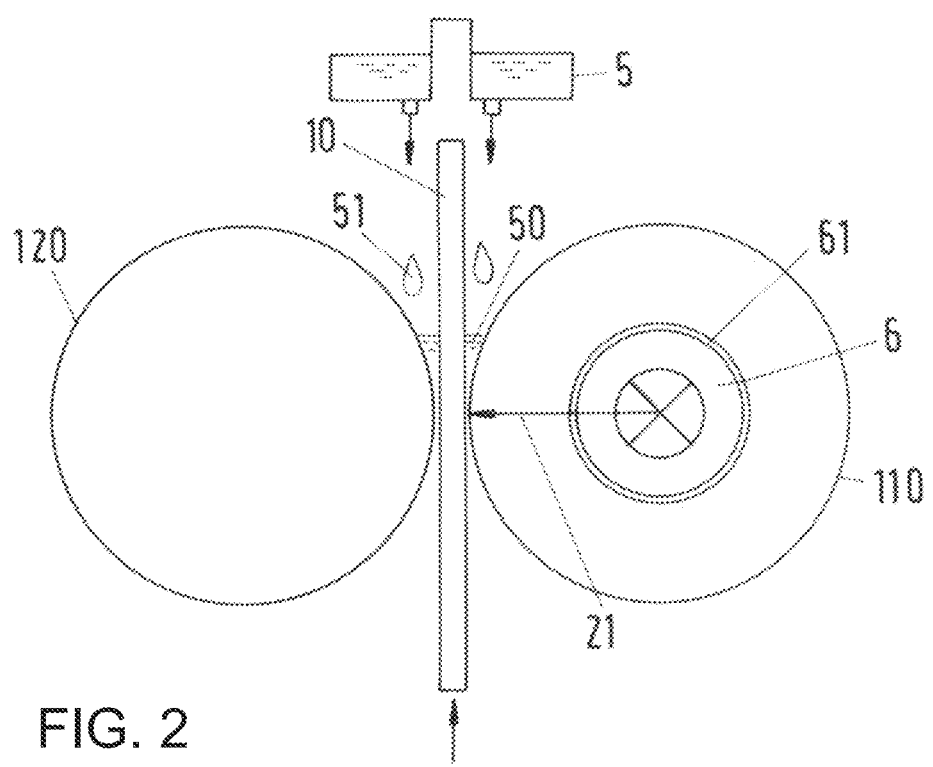
FIG. 2 is a side view of a device according to the invention for determining a layer thickness in a multilayer film with a fluid dispenser.

FIG. 2 shows a side view of a device 1 according to the invention for determining a layer thickness in the multilayer film 10 with a fluid dispenser 5.

The fluid dispenser 5 is provided in such a way that, in order to form an immersion fluid layer 50 between the multilayer film 10 and the first transport roller 110/second transport roller 120, the immersion fluid 51 can be discharged from the fluid dispenser 5. In this way, the electromagnetic primary radiation 21 from the first transport roller 110 can be guided onto the multilayer film 10 via the immersion fluid layer 50. For this purpose, the primary radiation 21 is introduced laterally into the support body and thus into the transport roller 110.

Figure 3:
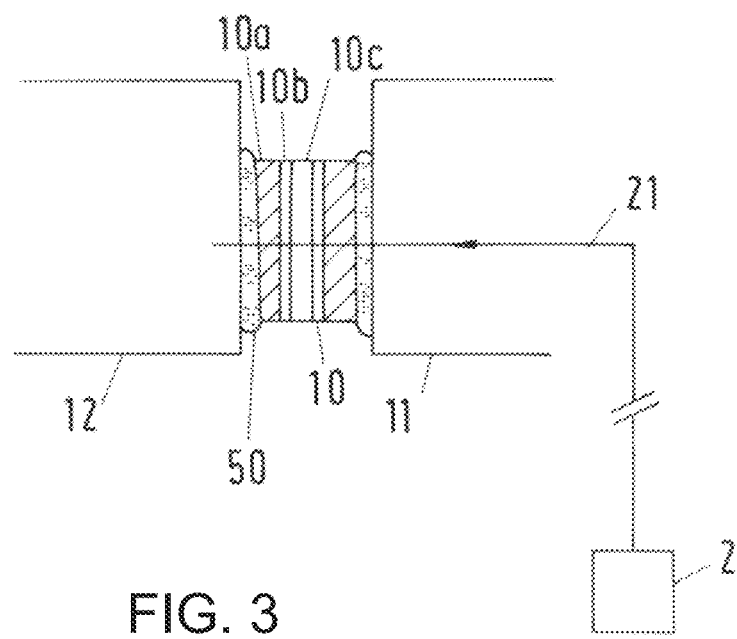
FIG. 3 is a schematic representation of a multilayer film between two contact blocks.

FIG. 3 shows a schematic representation of the multilayer film 10 between two contact blocks 11, 12.

The multilayer film 10 is clamped between the first contact block 11 and the second contact block 12. The primary radiation 21 is radiated from the radiation source 2 through the contact block 11 onto the multilayer film 10.

The multilayer film 10 comprises several different individual layers 10a, 10b, 10c with different individual layer thicknesses. In practice, the multilayer film 10 can be, for example, a barrier film with one EVOH layer (ethylene vinyl alcohol copolymer) 10c, two bonding layers 10b and two PE layers (polyethylene) 10a.

The beams reflected by the transitions between the individual layers 10a, 10b and 10c form the secondary radiation, which is detected in the detector. In this way, the different individual layer thicknesses can be determined from an A-scan of an OCT measurement.

Figure 4:
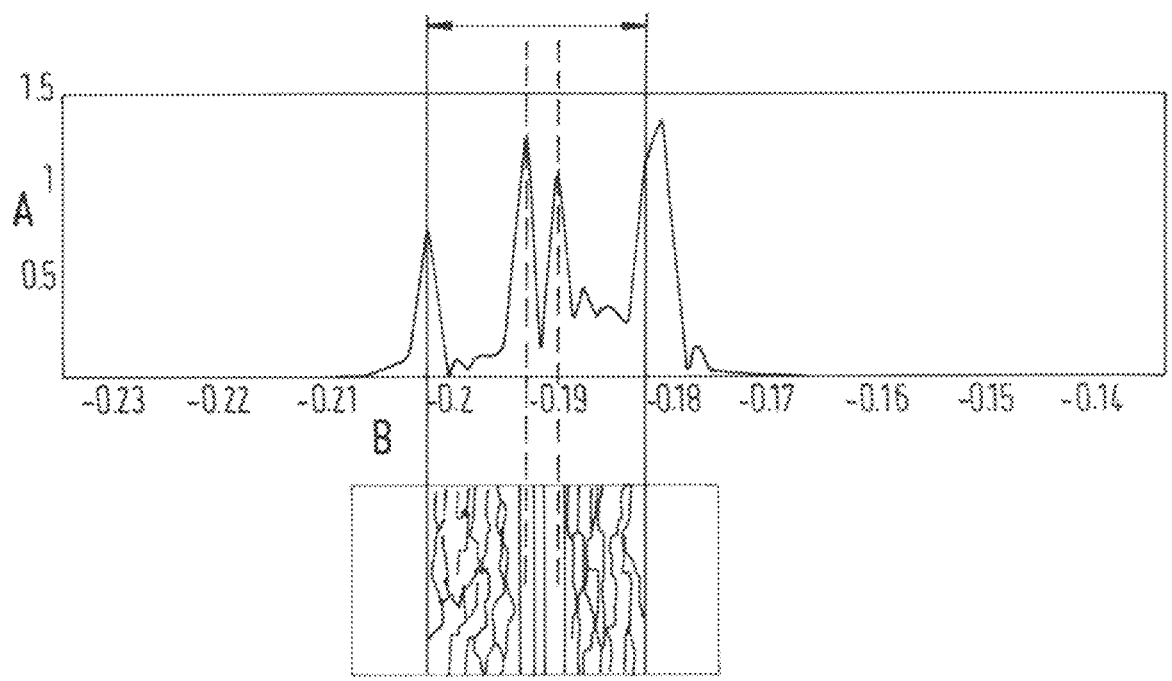
FIG. 4 is a representation of an A-scan with respect to a micro-photography of a cross section of a film.

FIG. 4 shows a representation of an A-scan of a PA/EVOH/PA multilayer film with regard to a micro-photography of a film cross-section.

B shows the position in the direction of the primary radiation, i.e. in the depth of the multilayer film. A shows an amplitude of the reflection (secondary radiation), respectively a signal proportional to the interference of the reflected secondary radiation with a reference beam. This representation of the measurement in the direction of the primary radiation is designated as A-scan. Different individual layer thicknesses of individual layers in the multilayer film can be read directly from the OCT-A scan.

Figure 5A:
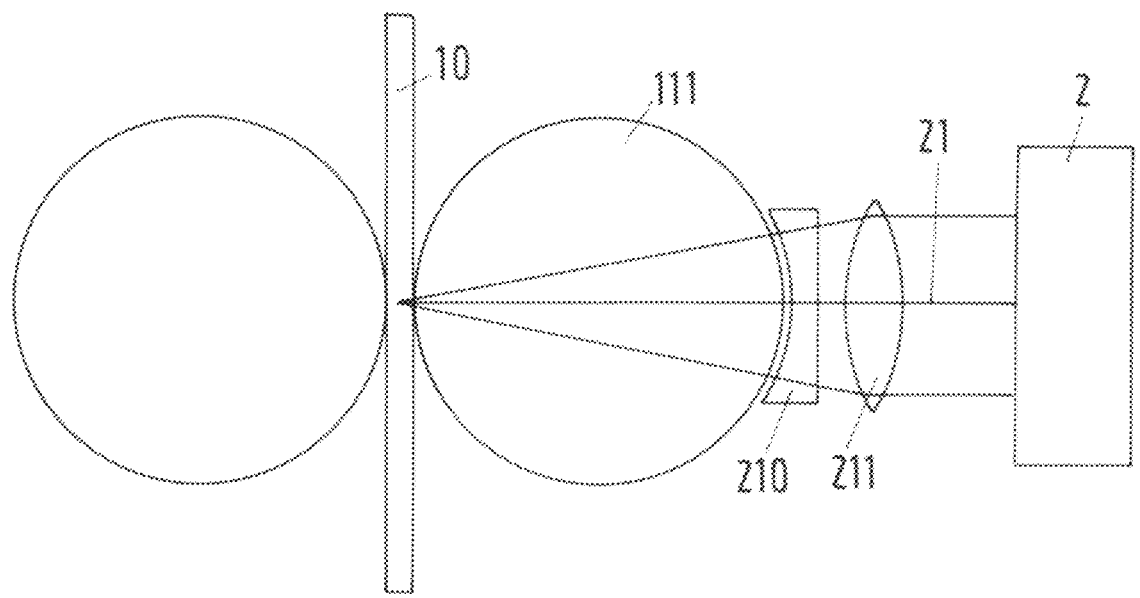
FIG. 5A is a schematic representation of a device according to the invention with a lens.

FIG. 5A shows a schematic representation of a device according to an embodiment of the invention with a lens.

The primary radiation 21 is coupled in the form of electromagnetic radiation, preferably in the form of broadband laser light in the device according to the invention for measuring the individual layers and the total thickness of the multilayer film 10. In the same way, the reflections generated by the multilayer film 10 and all index transitions are reflected back as secondary radiation.

The primary radiation 21 is focused onto the multilayer film 10 to be measured by the radiation source 2 through a (collecting) lens 211 through the contact block 111, which is transparent to the electromagnetic radiation. The contact block 111 is designed as a cylindrical roller and can in particular be a transport roller. An effect of the convex-cylindrical surface of the roller on the beam path is compensated by a cylindrical plano-concave lens 210.

Figure 6A:
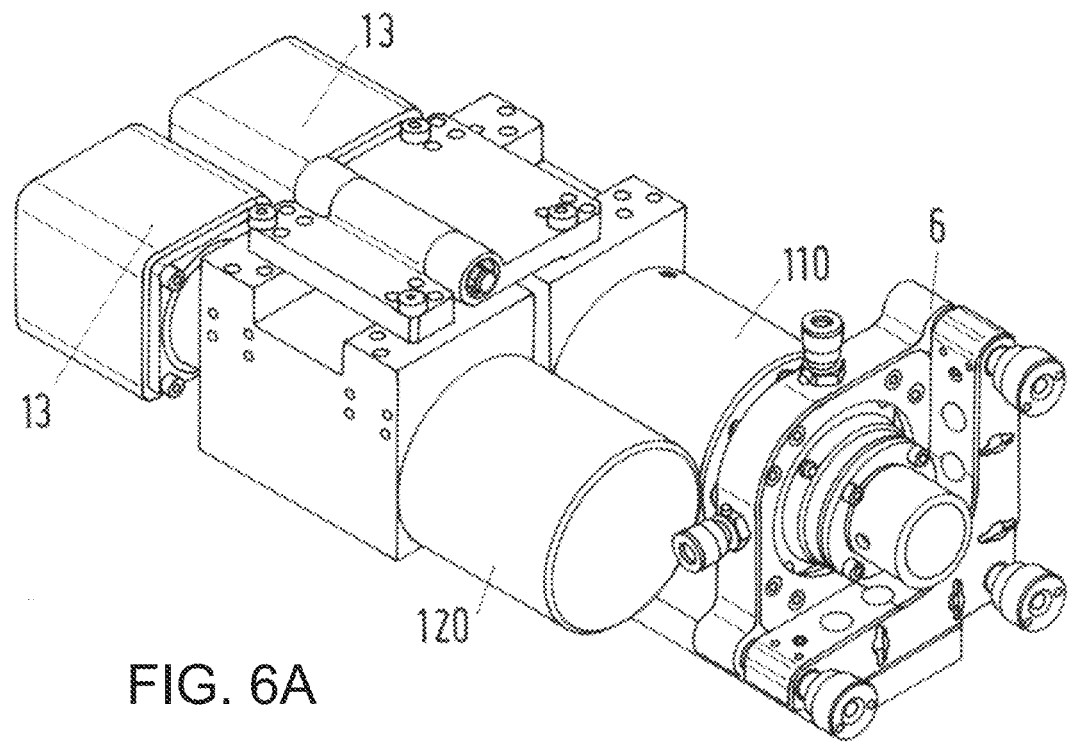
FIG. 6A and FIG. 6B are a schematic representation of a device according to the invention with two transport rollers.
Figure 6B:
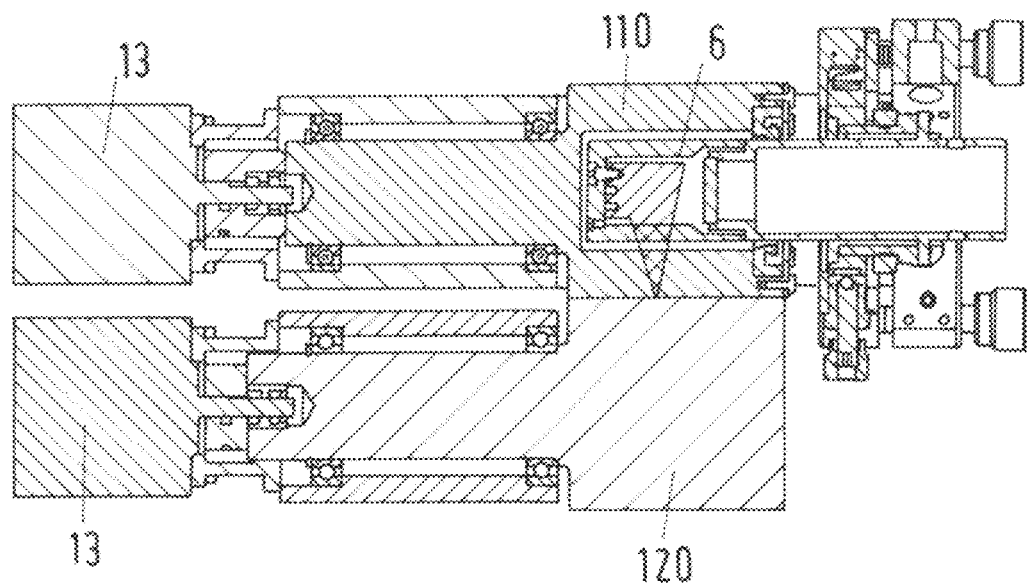

The contact block 111 for this type of coupling according to FIG. 6A and FIG. 6B, unlike a transport roller where a coupling of the primary radiation takes place through the longitudinal axis (i.e. from the side) as represented in FIG. 1A and FIG. 2, is designed without a central bore for the reception of a support.

Figure 5B:
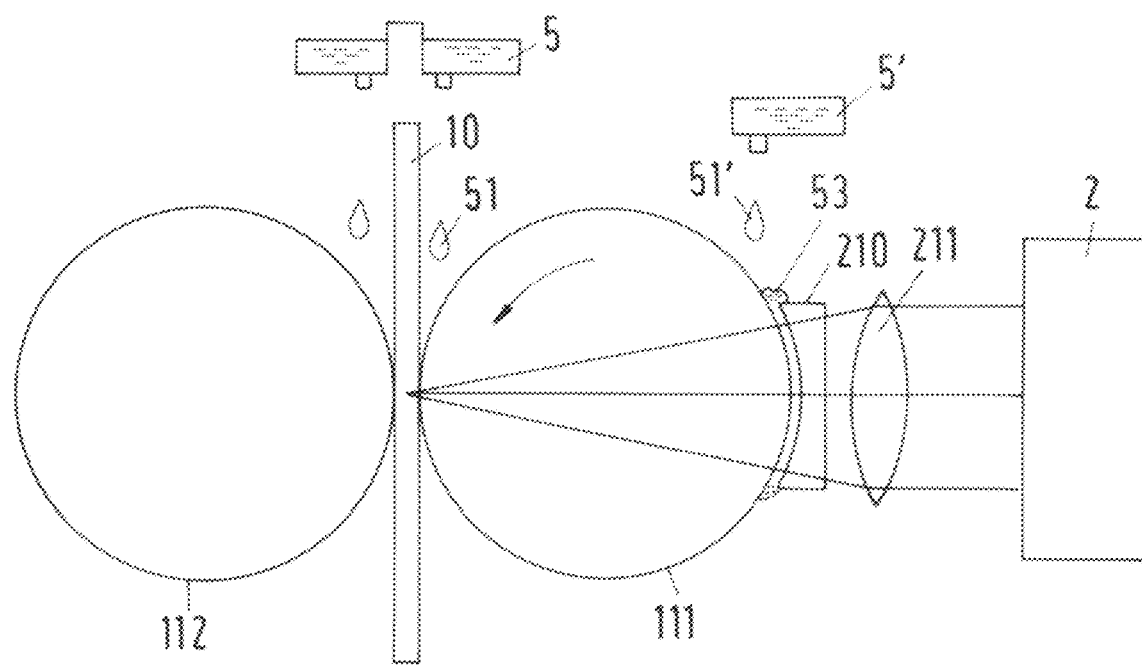
FIG. 5B is a schematic representation of the device according to the invention according to FIG. 5A with fluid dispenser.

FIG. 5B shows a schematic representation of the device according to the invention according to FIG. 5A with fluid dispenser 5, 5'.

A gap between the cylindrical contact block 111 and the plano-concave lens 210 is filled by an immersion fluid 51' to avoid reflections at the boundary surfaces. The refractive index of this immersion fluid 51' does not have to be equal to that of the immersion fluid 51, which is in contact with the multilayer film 10, but is selected suitable for the contact block 111 and the plano-concave lens 210.

If the contact blocks 111, 112 are designed as rotating transport rollers that convey the multilayer film 10 between the transport rollers, the immersion fluid 51' must be sufficiently thin fluid.

It can be conveyed in sufficient quantity from a reservoir 5' into the gap between the contact block 111 and the cylindrical plano-concave lens 210 to form an immersion fluid layer 53, which generates a largely air-free contact between the contact block 111 and the cylindrical plano-concave lens 210 at least in the beam path of the primary beam.

FIG. 6A shows a schematic representation of a device according to the invention with two transport rollers 110, 120.

The transport rollers 110, 120 are driven by stepping motors 13. The support body 6 is carried by a fine adjustment device. The second transport roller 120 is suspended in an oscillating manner such that it can press on the multilayer film with a certain pressure. The pressure must be selected such that there is only a small gap between the multilayer film and the transport rollers or that a good optical contact is ensured and that a sufficiently large force can act on the multilayer film to transport it. However, the film to be measured should not be squeezed.

What is claimed:

1. A device for determining a layer thickness in a multilayer film, comprising:
    a radiation source configured to generate an electromagnetic primary radiation; a detector configured to detect an electromagnetic secondary radiation emitted by the multilayer film, the secondary radiation being induced by an interaction of the primary radiation with the multilayer film; and
    a first transport roller transparent to the electromagnetic primary radiation and having a first transport surface for creating contact with the multilayer film, the first transport roller comprising an elastic coating on the first transport surface, the elastic coating being transparent to the electromagnetic primary radiation,
    the radiation source arranged on the first transport roller in such a way that the electromagnetic primary radiation is guided from the first transport roller onto the multilayer film.

2. The device according to claim 1, further comprising a fluid dispenser, which is provided in such a way that, in an operating state, for forming an immersion fluid layer between the multilayer film and the first transport roller the multilayer film is configured to being applied with an immersion fluid from the fluid dispenser and the electromagnetic primary radiation is configured to being guided from the first transport roller via the immersion fluid layer onto the multilayer film.

3. The device according to claim 1, wherein the radiation source is arranged on one side of the first transport roller in such a way that the electromagnetic primary radiation is configured to being guided along an axis into the first transport roller and a reflector is arranged offset to the axis in such a way that the electromagnetic primary radiation is configured to being focused onto the multilayer film.

4. The device according to claim 3, wherein the first transport roller is rotatable around a first axis of rotation.

5. The device according to claim 4, wherein the reflector is arranged in the first transport roller by a stationary support body, and, in a rotation gap between the support body and the first transport roller rotatable around the support body, an immersion fluid is arranged to suppress a reflection by avoiding a refractive index change at a material boundary.

6. The device according to claim 5, wherein the reflector is arranged in the support body and the support body includes a solid material or is filled with an immersion fluid.

7. The device according to claim 3, wherein the reflector is a mirror.

8. The device according to claim 3, wherein the reflector is an off-axis parabolic mirror.

9. The device according to claim 4, further comprising a second transport roller with a second transport surface configured to transport the multilayer film, the second transport surface serving to transport the multilayer film, which is arranged between the first and the second transport surface.

10. The device according to claim 9, wherein in an operating state a pressure is configured to being exerted on each other by the first transport roller and the second transport roller such that a distance between the first transport roller, the second transport roller and the multilayer film is minimized by the elastic coating and air is configure to being displaced from a contact area of the first transport roller and the multilayer film.

11. The device according to claim 1, further comprising an interferometer configured to divide a source radiation which is configured to being generated by the radiation source into the electromagnetic primary radiation and a reference beam by a beam splitter of the interferometer.

12. The device according to claim 1, wherein the radiation source is a radiation source configured to generate electromagnetic primary radiation of high coherence length.

13. The device according to claim 1, wherein the radiation source is a radiation source for configured to generate electromagnetic primary radiation of low coherence length.

14. A method for determining a layer thickness in the multilayer film with the device according to claim 1, the method comprising:
    creating the contact between the first transport surface and the multilayer film;
    guiding the electromagnetic primary radiation from the first transport roller onto the multilayer film;
    detecting the electromagnetic secondary radiation emitted by the multilayer film, the secondary radiation being induced by the interaction of the primary radiation with the multilayer film.

15. The method according to claim 14, further comprising applying an immersion fluid from a fluid dispenser to the multilayer film to form an immersion fluid layer between the multilayer film and the transport roller.

16. The method according to claim 15, wherein a first refractive index of the first transport roller is substantially equal to a second refractive index of the immersion fluid and simultaneously substantially equal to a third refractive index of a surface layer of the multilayer film and a ratio of the first refractive index to the second refractive index is equal to a ratio of the second refractive index to the third refractive index and is between 0.9 and 1.1.

17. The method according to claim 14, wherein the secondary radiation is a secondary radiation transmitted by the multilayer film or reflected by the multilayer film.

18. The method according to claim 15, wherein a first refractive index of the first transport roller is substantially equal to a second refractive index of the immersion fluid and simultaneously substantially equal to a third refractive index of a surface layer of the multilayer film and a ratio of the first refractive index to the second refractive index is equal to a ratio of the second refractive index to the third refractive index and is between 0.95 and 1.05.

19. The device according to claim 1, wherein the radiation source is a laser.

20. The device according to claim 1, wherein the radiation source is a broadband light source.

* * * * *